United States Patent [19]
Merriam

[11] 3,824,348
[45] July 16, 1974

[54] STATUS INDICATION CIRCUIT FOR SHARED TELEPHONE EQUIPMENT

[75] Inventor: Donald R. Merriam, Rochester, N.Y.

[73] Assignee: Stromberg-Carlson Corporation, Rochester, N.Y.

[22] Filed: May 4, 1973

[21] Appl. No.: 357,320

[52] U.S. Cl. .......... 179/18 AB
[51] Int. Cl. .......... H04q 3/00
[58] Field of Search .......... 179/18 AB

[56] References Cited
UNITED STATES PATENTS 3,210,478 10/1965 Klees et al. .......... 179/18 AB
3,430,000 2/1969 Rohrig .......... 179/18 AB

*Primary Examiner*—William C. Cooper
*Attorney, Agent, or Firm*—Charles C. Krawczyk; William F. Porter, Jr.

[57] ABSTRACT

A status indication circuit is provided for indicating the busy-idle condition of shared telephone call processing equipment to an access circuit which is attempting to complete a connection to the shared equipment. The status indication circuit provides a substantially constant busy voltage indication which is independent of the impedance of the access circuit connected thereto and prevents simultaneous connections by more than one access circuit to the same shared equipment.

10 Claims, 3 Drawing Figures

STATUS INDICATION CIRCUIT FOR SHARED TELEPHONE EQUIPMENT

BACKGROUND OF THE INVENTION

This invention relates in general to telephone systems and in particular to status indication circuits for indicating the busy-idle condition of shared call processing equipment to an access circuit attempting to complete a connection to the shared equipment.

Quite often — because of practical requirements and economical limitations — some types of equipment in a telephone system are provided in substantially smaller quantities than other types of equipment — for example when one of the latter types of equipment (hereinafter, called "primary equipment") must be utilized for processing each call which enters the system (for example, a recording trunk in a toll ticketing system) or for relatively long portions or all of some calls. The former types of equipment — for example, a multifrequency detector circuit in a toll ticketing system — generally are employed only briefly, if at all, during a particular call or only during relatively few calls.

Therefore, types of equipment which are provided in smaller numbers must be shared by the primary equipment and it is necessary to provide a mechanism whereby each type of primary equipment may, when required, be quickly and reliably connected to a piece of shared equipment which is not then in use.

In shared equipment telephone systems currently in use, each piece of shared equipment has a status indication circuit for indicating the busy-idle status of that piece of shared equipment and each of the type of primary equipment which may be connected to a piece of shared equipment has an access circuit which samples the status indication circuit associated with that shared piece of equipment. If the access circuit detects that the shared equipment is idle, the access circuit completes a connection between the piece of primary equipment and the piece of shared equipment. Heretofore, the status indication circuits which have been utilized with shared equipment have consisted of an output terminal connected to a battery via a resistor of a predetermined size. When the shared equipment is idle, the output terminal is effectively connected to an external open circuit, no current flows through the resistor and the potential at the output terminal is substantially equal to the battery output potential (typically −48 volts). When an access circuit samples the voltage at the output terminal, the magnitude of the potential present is sufficient to energize one or more relays in the access circuit which then completes a connection between the primary equipment and the shared equipment.

When a piece of shared equipment is busy, the output terminal in the associated status indication circuit has already been connected to an access circuit and the current flowing into the relays in the access circuit causes a voltage drop across the resistor in the status indication circuit which reduces the potential at the output terminal to approximately one-half (−24 volts) of the battery potential. When a second access circuit attempts to complete a connection to the shared equipment and samples the potential at the output terminal, the −24 volt potential present thereon is insufficient to energize the one or more relays in that second access circuit and the connection is made instead to a free piece of shared equipment — if one exists — which may be accessed by that second access circuit.

Although existing status indication circuits generally function satisfactorily, they suffer from two serious drawbacks. First, two access circuits occasionally sample a status indication circuit simultaneously or substantially simultaneously. If the shared equipment, with which that status indication circuit is associated, is idle, a −48 volt potential is present on the output terminal of the status indication circuit and both access circuits, upon receiving the idle indication, will attempt to complete connections to the same piece of shared equipment and a so-called "double-connect" takes place. Therefore, two telephone calls are not successfully completed and generally both of the calls must be retried.

Such simultaneous connections, although relatively infrequent, are annoying to the subscriber when they do occur and often necessitate hanging-up and redialing the calls. Even if the calling subscriber decides to complete his call, the presence of an unexpected third party on the line is generally undesirable. The occurrence of "double-connects" is also undesirable from the point of view of the telephone company. Company switching equipment receives unnecessary wear if a call is not successfully completed on the first attempt and must be retried. In addition, the proper operation of billing or other call processing equipment may be rendered impossible when two calls are inadvertently connected together.

The second major drawback of existing status indication circuits has been that the potential present at the output terminal which is sampled by the access circuit has varied as a function of the current flowing through the output terminal and a resistor connected in series therewith into a connected access circuit and, therefore, varies as a function of the impedance of the access circuit. Since access circuits have generally utilized at least one relay, corresponding to each piece of shared equipment to which the access circuit may complete a connection, to complete a given connection, each access circuit is provided with at least two relays with their respective settings marginally adjusted to insure that only one of the relays becomes energized when the access circuit is requested to complete a connection and more than one of the pieces of shared equipment to which the access circuit may complete a connection is idle. In order for such marginally adjusted relays to function satisfactorily, the voltage which is applied thereto must remain substantially constant for busy or idle indications in order to eliminate duplicate energization or failure to energize any of the relays. Consequently, in systems in which the potential at the output terminal of the status indication circuits has fluctuated over a period of time, it has been necessary periodically to readjust the relay settings in the access circuits with resultant temporary down time for the access circuits and associated equipment and expenditure of manpower, time and money. Furthermore, in systems in which the potential at the output terminals of the status indication circuits fluctuates, it has been difficult to take advantage of current advances in technology such as printed card circuits, since it is extremely difficult, if not impossible, to adjust the printed circuit elements once they have been installed.

Accordingly, it is an object of the present invention to provide a new and improved status indication circuit which detects simultaneous or substantially simultaneous attempts by more than one access circuit to complete a connection to a particular piece of shared equipment and provides an output in response to that detection which forces the access circuits either to attempt to complete a connection to another piece of shared equipment or to retry to attempt the completion to the first-mentioned piece of shared equipment.

It is another object of the present invention to provide a status indication circuit which has a substantially constant potential at its output terminal both under shared equipment busy and shared equipment idle conditions.

Still another object of the present invention is to provide such a status indication circuit which is compatible with printed circuit card-type access circuits which are becoming more common in telephone systems employing shared equipment.

A still further object of the present invention is to provide a status indication circuit which eliminates the need for marginally adjusted relays in access circuits which are provided to complete connections to shared telephone equipment.

A still further object of the present invention is to provide in a telephone system of the type which has shared equipment the combination of a status indication circuit and an access circuit both of which may be printed circuits, which may be utilized together, which eliminate the requirement for marginally adjusted relays in the access circuit and which cooperate to prevent simultaneous connection of more than one access circuit to a single status indication circuit.

BRIEF DESCRIPTION OF THE DRAWINGS

Other objects, features and advantages of the present invention will become apparent from the following description of a preferred embodiment, taken together with the attached drawings thereof, in which:

Referring now to FIG. 1, there are shown portions of a toll ticketing system, generally designated 20, utilizing a status indication circuit constructed in accordance with the present invention. The toll ticketing system 20 includes a plurality of (for example, forty) recording trunks 22*a*–22*n* each of which is arranged to be connected via any one of a plurality of its respective incoming lines 24*a*–24*n* to a telephone toll call and to centralize the processing of the connected toll call. Each recording trunk 22*a*–22*n* is connected to automatic toll call billing equipment designated 26. The toll ticketing system 20 has a plurality of (for example, three) multifrequency detector (MFD) circuits 28*a*–28*x* which are arranged to receive tone signals from external toll equipment, a plurality of (for example, six) toll pulse acceptor (TPA) circuits 30*a*–30*y* which are arranged to receive locally dialed local toll pulse signals and a plurality of (for example, two) operator number identification (ONI) link circuits 32*a*–32*z* which are arranged to connect the toll call to an operator for identification of the calling line number.

MFD circuits 28*a*–28*x*, TPA circuits 30*a*–30*y* and ONI link circuits 32*a*–32*z* are generally utilized only briefly during any telephone call. Therefore, those circuits may be provided in smaller quantities than the number of recording trunks 22*a*–22*n* which are required for a particular toll ticketing system 20. In addition, for reasons of economy, each MFD circuit 28*a*–28*x*, TPA circuit 30*a*–30*y* and ONI link circuit 32*a*–32*z* may be shared by more than one recording trunk 22*a*–22*n*.

Each recording trunk 22*a*–22*n* is provided with a first relay access circuit 34*a*–34*n* which is arranged to connect its respective recording trunk 22*a*–22*n* to one or more of the MFD circuits 28*a*–28*x* via one of its respective set of outgoing lines 36*a*–36*n*, a second relay access circuit 38*a*–38*n* which is arranged to connect its respective recording trunk 22*a*–22*n* via one of its respective set of outgoing lines 40*a*–40*n* to one or more of the TPA circuits 30*a*–30*y* and a third relay access circuit 42*a*–42*n* which is arranged to connect its respective recording trunk 22*a*–22*n* via one of its respective set of outgoing lines 44*a*–44*n* to one or more of ONI link circuits 32*a*–32*z*. (The access circuits described herein are relay access circuits which utilize relays to perform the switching to complete desired connections. It will be appreciated by those skilled in the telephony art that, although the following description relates to relay access circuits, other types of access circuits — for example access circuits which employ core wound sensors — may be employed within the context of the present invention.)

Although each recording trunk 22*a*–22*n* has been shown, for the purposes of illustration, as having one each of relay access circuits 34*a*–34*n*, 38*a*–38*n* and 42*a*–42*n* (all of access circuits 34, 38 and 42 may be identical) it should be appreciated that depending upon the particular type of access circuit utilized (for example, an "access two" circuit which permits the recording trunk 22*a*–22*n* to be connected to either of two pieces of shared equipment of any given type) and depending upon the requirements of the particular toll ticketing system 20, more than one of each of access circuits 34*a*–34*n*, 38*a*–38*n*, or 42*a*–42*n* may be connected to a particular recording trunk 22*a*–22*n* to provide access to a greater number of pieces of shared equipment of a particular type. Furthermore, any particular shared piece of equipment generally may be accessed by different access circuits, which are connected to different recording trunks 22*a*–22 *n*.

Figure 1:
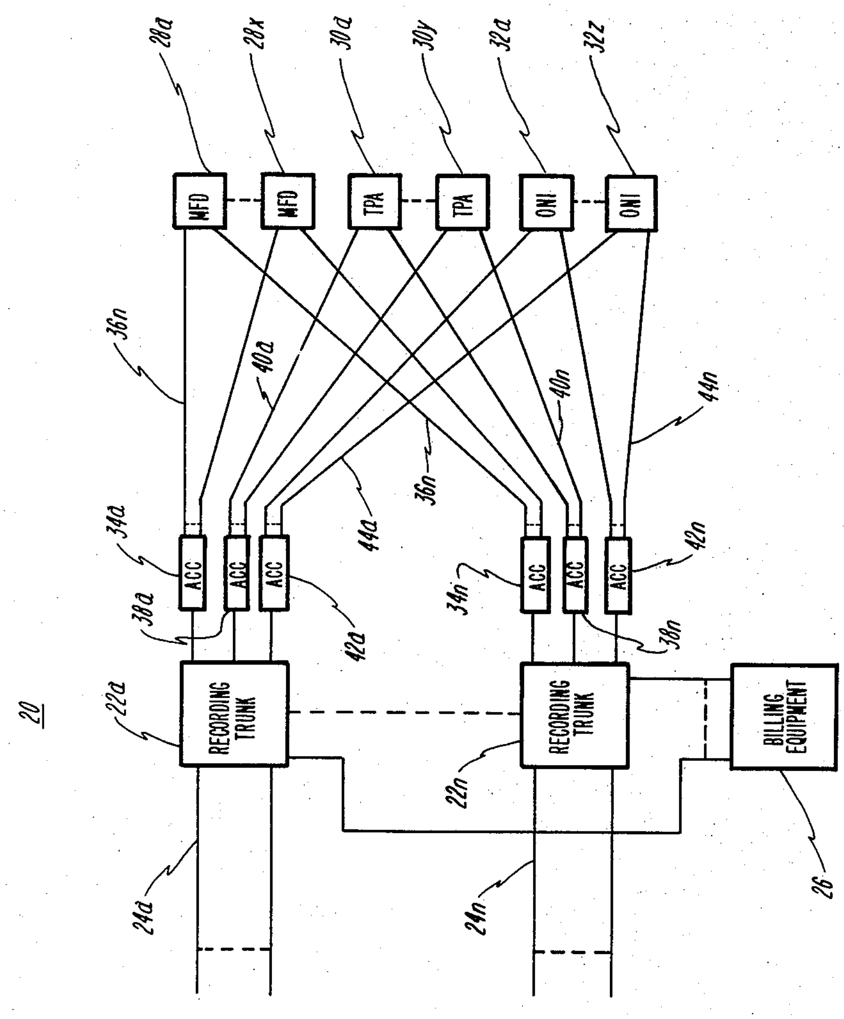
FIG. 1 is a block diagram of portions of a toll ticketing system in which a status indication circuit constructed in accordance with the present invention is utilized.
Figure 2:
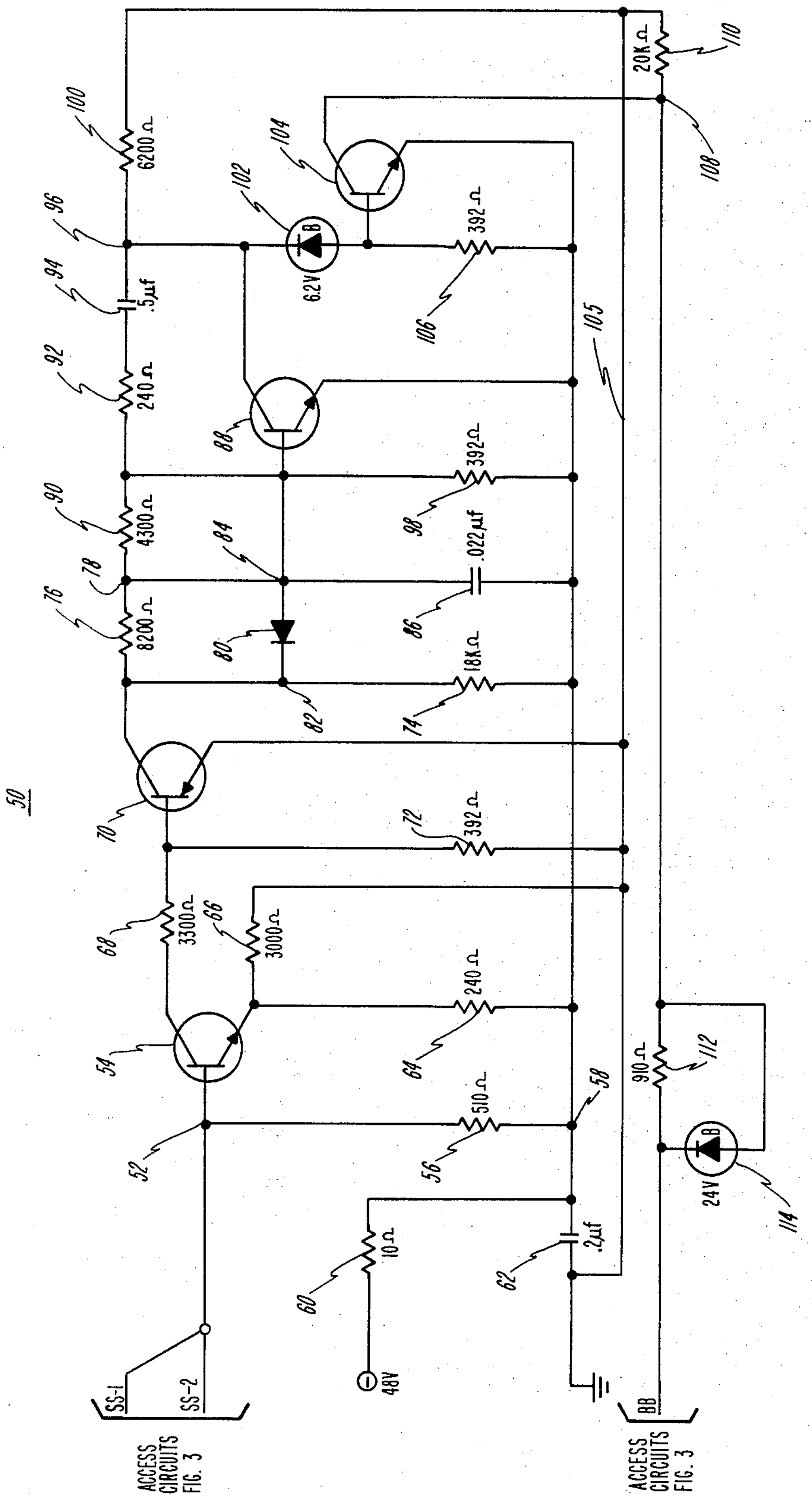
FIG. 2 is an electrical schematic wiring diagram of a shared equipment status indication circuit constructed in accordance with the present invention.

Referring now to FIG. 2, there is shown a status indication circuit, generally designated 50, which is provided in each of the MFD's 28*a*–28*x*, the TPA's 30*a*–30*y* and the ONI links 32*a*–32*z*. Each of the status indication circuits 50 is arranged to be sampled or tested via one or more lines SS which are connected between the relay access circuits 34, 38 and 42 corresponding to the recording trunks 22*a*–22*n* which may utilize the piece of shared equipment with which the particular status indication circuit 50 is associated. For simplicity in explanation, only lines SS-1 and SS-2 are shown connected to the status indication circuit 50 in FIG. 2. Lines SS-1 and SS-2 are connected to a junction 52 which is directly connected to the base electrode of a "threshold" transistor 54 and is connected via a resistor 56 to a junction 58. The junction 58 is connected via a resistor 60 to a −48 volt battery supply and via a capacitor 62 to ground. The emitter of the threshold transistor 54 is connected via a resistor 64 to the junction 58 and via a resistor 66 to ground, and the collector of the threshold transistor 54 is connected via a resistor 68 to the base of an "amplifier" transistor 70. The base of the amplifier transistor 70 is also connected via a resistor 72 to ground and the emitter of the amplifier transistor 70 is directly connected to ground. The collector of the amplifier transistor 70 is connected via a resistor 74 to the −48 volt supply and via a resistor 76 to a junction 78. A diode 80 is connected in parallel with the resistor 78 between junctions 82 and 84. The junction 84 is connected via a capacitor 86 to the −48 volt supply and is directly connected to the base electrode of an "inverter" transistor 88. The junction 78 is also connected via a resistor 90 to the base of inverter transistor 88 and via a resistor 92, a capacitor 94 and a junction 96 to the collector of the inverter transistor 88. The base of the inverter transistor 88 is connected via a resistor 98 to the −48 volt supply, and the emitter of the inverter transistor 88 is directly connected to the −48 volt supply. The junction 96 is connected via a resistor 100 to ground and via a zener diode 102 (having a 6.2 volt breakdown voltage) to the base electrode of a "switching" transistor 104. The base of the switching transistor 104 is connected via a resistor 106 to the −48 volt supply. The emitter of the switching transistor 104 is directly connected to the −48 volt supply, and the collector of the switching transistor 104 is connected via a junction 108 and a resistor 110 to ground. The collector of the switching transistor 104 is also connected via the junction 108 and a resistor 112, having a zener diode 114 (with a 24 volt breakdown voltage) connected in parallel therewith, to a lead designated BB (and discussed in greater detail below) which is connected to the corresponding relay access circuit(s) 34, 38, or 42.

Figure 3:
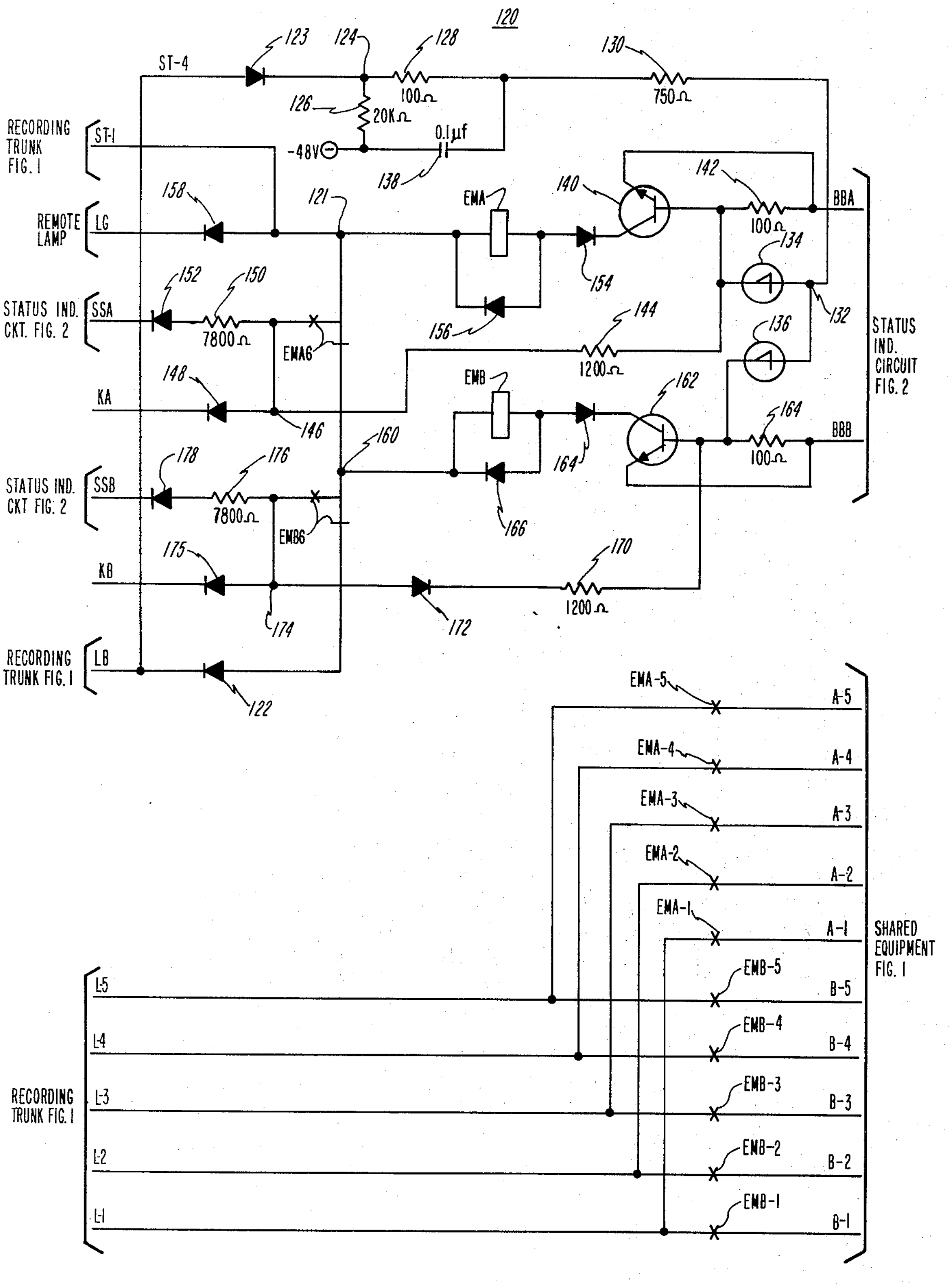
FIG. 3 is an electrical schematic wiring diagram of an access circuit which may be utilized with the status indication circuit of the present invention.

Referring now to FIG. 3, the connection of a typical relay access circuit, generally designated 120, will now be described in greater detail.

The relay access circuit 120 which is shown is of the "access two" variety — i.e., the relay access circuit 120 is responsive to a request for service from the recording trunk **22*a*–22*n* to which it is connected to test, or sample, the busy-idle status of two status indication circuits (corresponding to two pieces of shared equipment of a particular type) to which it is connected and, if one or both of the status indication circuits indicate that its respective piece of shared equipment is idle, to complete an almost instantaneous connection between its respective recording trunk 22*a*–22*n* and an idle piece of shared equipment. Advantageously, the relay access circuit 120 is provided in the form of a printed circuit card (or portion of a printed circuit card) and because of inherent differences between components mounted on the card (as will be discussed in greater detail below) the relay access circuit 120 insures that, if more than one status indication circuit 50 indicates that its associated piece of shared equipment is idle, a connection will be completed between the recording trunk 22*a*–22*n* and only one of the idle pieces of shared equipment. Furthermore, it will be readily appreciated from the following discussion that with minor modifications and/or duplication of portions of the circuitry shown in FIG. 3, the relay access circuit 120 may be converted to a circuit of the "access n" type ($n>1$) where particular system requirements so dictate. The relay access circuit 120 has an input line ST-1 from the recording trunks 22*a*–22*n* to which it is connected and the input line ST-1 is connected via a junction 121, normally closed contacts EMA-6, a junction 160, normally closed contacts EMB-6 and a diode 122 directly to an output line LB to the recording trunk 22*a*–22*n* and to a line ST-4 which is connected via a diode 123, to a junction 124. A −48 volt supply is connected via a resistor 126 to the junction 124 and the junction 124 is connected via a resistor 128 and a resistor 130 to a junction 132 which in turn is connected to the anodes of four layer diodes 134 and 136 each of which has a firing voltage of approximately 39 volts. A 0.1 microfarad capacitor 138 is connected in parallel with the resistors 126 and 128 and the resistor 128 and the capacitor 138 define a wave shaping circuit for input pulses transmitted via input line ST-4 from the associated recording trunk 22*a*–22*n* after the pulses have been passed through the loop between lines ST-1 and LB. The cathode of the four layer diode 134 is connected directly to the base electrode of a transistor 140 and via a resistor 142 to a first input line BBA (from one of the two status indication circuits 50 connected to the relay access circuit 120). The emitter of the transistor 140 is directly connected to the input line BBA. The cathode of the four layer diode 124 is also connected via a resistor 144 to a junction 146 and the junction 146 is connected both via a diode 148 to an output line KA and via a resistor 150 and a diode 152 to an output line SSA which is connected to a status indication circuit 50 (and defines one of the SS input lines of FIG. 2). The collector of the transistor 40 is connected via a diode 154 to a relay EMA (having a diode 156 connected in parallel therewith) and the relay EMA is in turn connected to the input lead ST-1 via junction 121. The junction 121 is connected via a diode 158 to an output line LG which is connected to an indicating lamp (not shown) which may be utilized to provide a visual indication that a recording trunk 22*a*–22*n* has requested service. The relay EMA also has make and break contacts EMA-6 with the normally open contacts connected between relay EMA and the resistor 150 in output line SSA and with the normally closed contacts connected between the relay EMA and the junction 160.**

The circuitry associated with the second four layer diode 136 is substantially a duplication of the circuitry associated with the four layer diode 134 and is utilized to provide access to a different piece of shared equipment from that which may be accessed by the circuitry associated with four layer diode 134.

In particular, the cathode of the second four layer diode 136 is directly connected to the base electrode of a transistor 162 and via a resistor 164 to a second input line, designated BBB, from a status indication circuit 50. The emitter of the NPN transistor 162 is connected directly to line BBB and the collector of the transistor 162 is connected via a diode 166 to one side of a relay EMB (having a diode 168 connected in parallel therewith). The other side of the relay EMB is connected to the junction 160.

The base of the transistor 162 is connected via a resistor 170 and a diode 172 to a junction 174 which is connected in turn via a diode 175 to an output lead KB. The junction 174 is also connected via a resistor 176 and a diode 178 to an output line SSB which is connected to a second status indication circuit 50. The relay EMB has make and break contacts EMB-6 with the normally open contacts connected between the junction 160 and the resistor 176 and the normally closed contacts connected between junction 160 and the diode 180 in the output line LB.

Each of the relay access circuits 120 has five input lines L-1 through L-5 connected to its associated recording trunk 22*a*–22*n* and ten output lines (designated A-1 through A-5 and B-1 through B-5) and the input lines L-1 through L-5 are arranged to transmit information from a recording trunk 22*a*–22*n* to a connected one of the two pieces of shared equipment which may be accessed by the relay access circuit 120. When a recording trunk 22*a*–22*n* has requested service and an associated relay access circuit 120 determines that one of the pieces of equipment (either A or B) is idle, either the relay EMA or the relay EMB is energized closing either contacts EMA-1 through EMA-5 or contacts EMB-1 through EMB-5, respectively, thereby effecting a connection between lines L-1 through L-5 and either lines A-1 through A-5 or lines B-1 through B-5, respectively, and completing the circuit from the recording trunk 22*a*–22*n* to the connected piece of shared equipment.

In operation, when a piece of shared equipment is idle, the threshold transistor 54 in the associated status indication circuit 50 is biased off, switching transistor 104 is on, and a –48 volt potential is present on output lead BB of the status indication circuit. No current flows through resistor 112 and, therefore, zener diode 114 is switched off. Assuming initially that both of the status indication circuits 50 to which a relay access circuit 120 is connected are idle, the –48 volt potential is present on both of input leads BBA and BBB in FIG. 3 and therefore at the cathodes of four layer diodes 134 and 136. In the absence of a request for service from the recording trunk 22*a*–22*n* to which the relay access circuit 120 is connected, a –48 volt potential (from the battery supply shown in FIG. 3) is also present at the anodes of the four layer diodes 134 and 136 and, therefore, neither of the four layer diodes conducts.

When the recording trunk 22*a*–22*n* to which the relay access circuit 120 is connected requests service, the recording trunk 22*a*–22*n* transmits a ground pulse to the relay access circuit 120 via first input line ST-1. The ground pulse is transmitted to the lamp connected to line LG and via normally closed contacts EMA-6 and EMB-6 and line LB back to the recording trunk 22*a*–22*n* and simultaneously to line ST-4. The transmittal of the ground pulse back to the recording trunk 22*a*–22*n* provides an indication that the access circuit 120 has received the request for service and that the access circuit 120 has not already been utilized to complete a connection. If the access circuit 120 has already completed a connection to a piece of shared equipment, one of the relays EMA or EMB would have been operatively energized and one of the normally closed contacts EMA-6 or EMB-6 would be open, preventing the transmittal of the ground pulse back to the recording trunk 22*a*–22*n*. The resistor 128 and the capacitor 138 shape the ground pulse present on line ST-4 into a ramp-type (exponential) wave which is applied via resistor 130 and junction 132 to the anodes of four layer diodes 134 and 136. The voltage at the anodes of the four layer diodes 134 and 136 increases from –48 volts toward zero volts and when the anode voltage approaches –9 volts (i.e., when the voltage across one of the four layer diodes 134 and 136 reaches its firing voltage), one of the four layer diodes 134 and 136 fires. Four layer diodes 134 and 136 inherently have discrete differences in their respective firing voltages and the difference between the firing voltages is of sufficient magnitude so that when a ramp-type voltage is applied to the anodes thereof, one of the four layer diodes fires before the other of the four layer diodes.

Assuming for the purposes of illustration that four layer diode 134 fires first, transistor 140 is immediately forward biased and current immediately begins to flow through the relay EMA. In addition current immediately flows through resistors 128 and 130, four layer diode 134 and resistor 142 via lead BBA to the BB lead in the connected status indication circuit 50. This current flow almost immediately generates a voltage drop across resistor 112 in the status indication circuit 50 and that voltage drop increases until the zener diode 114 fires and the potential of the BB lead is quickly lowered to and subsequently maintained at –24 volts by zener diode 114. As will be apparent to those skilled in the telephony art, the potential present on the BB lead in the status indication circuit 50 is lowered to its "busy indication" level of –24 volts much more rapidly than has heretofore been the case, since the potential on the BB lead is not dependent upon the current drawn by one or more relay coils (which generally must become energized before the relay access circuit has completed a connection) in order to indicate that the status indication circuit has been sized. With the time required for the potential of the BB lead to drop from –48 volts to –24 volts now reduced from the conventional duration fifteen to twenty milliseconds to a duration of the order of a maximum of one microsecond, the probability of an attempt by a second access circuit 120 to complete a connection to a busy piece of shared equipment (before the potential on the line BB of the associated status indication circuit 50 has been reduced to –24 volts) is virtually eliminated.

When the relay EMA becomes energized, the normally open (make) contacts of the pair EMA-6 close and a ground pulse is applied via the resistor 150 and diode 152 to an SS input lead to the status indication circuit 50. The ground pulse is also applied via junction 146 and resistor 144 to the cathode of four layer diode 134 and to the base of transistor 140 and via junction 146 and diode 148 to the lead KA. The normally closed (break) contacts of the pair EMA-6 open and remove the ground pulse from input lead ST-4; however, the ground pulse applied to the base of the transistor 140 via resistor 144 maintains the transistor 140 in a conducting state. The ground pulse transmitted via the output lead KA may be utilized to energize an auxiliary relay — for example, to connect additional lines (in addition to the lines L-1 through L-5 shown in FIG. 3) between the recording trunk 22*a*–22*n* and the shared equipment.

When one of the shared pieces of equipment (for example an MFD circuit 28*a*–28*x*) is busy, a 7,800 ohm ground is presented to the status indication circuit 50 on a line SS from the relay access circuit 120 which has completed the connection thereto. The potential developed across the resistor 56 in status indication circuit 50 is insufficient to forward bias the base-to-emitter junction of the threshold transistor 54 which remains off. The inverter transistor 88 remains off and switching transistor 104 is maintained in an on state by the potential developed across the resistor 106. When the switching transistor 104 is on, the −48 volt supply is connected via the parallel combination of the resistor 112 and the zener diode 114 to the line BB and the voltage drop across the resistor 112 increases to twenty-four volts whereupon the zener diode 114 breaks down and the output potential of line BB is maintained substantially constant at −24 volts by zener diode 114.

Referring again to FIG. 3, if one of the status indication circuits 50 (to which a particular relay access circuit 120 is connected), is associated with a busy piece of shared equipment, the output potential on its output line BB (assumed here, for the purposes of explanation, to be connected to lead BBB in FIG. 3) will be at −24 volts. When a recording trunk 22*a*–22*n* requests service, a ground pulse is applied via the loop defined by input line ST-1, the normally closed contacts EMA-6 and the normally closed contacts EMB-6 to line ST-4. The ground pulse is shaped by the resistor 128 and the capacitor 138 and is applied to the anodes of four layer diodes 134 and 136. If the shared equipment corresponding to the BBA lead is idle, the cathode of four layer diode 134 is at a potential of −48 volts; on the other hand, since the shared equipment corresponding to the BBB lead is assumed to be busy, the cathode of four layer diode 136 is at −24 volts. Therefore, four layer diode 134 fires long before four layer diode 136 approaches its firing potential and transistor 140 is switched on and relay EMA is energized, as described above.

In the event that two or more relay access circuits 120 attempt to complete a connection to a piece of shared equipment substantially simultaneously, two or more 7,800 ohm connections to ground are connected in parallel to the base of the threshold transistor 54 and the potential developed across the resistor 56 is sufficient to forward bias the base-to-emitter junction of the threshold transistor 54 which is then switched on. The output of the threshold transistor 54 is amplified by the amplifier transistor 70 and inverted by the inverter transistor 88. The breakdown diode 102 is switched off and the switching transistor 104 is switched off. When the switching transistor 104 is switched off, the ground on line 105 is transmitted to the BB lead via the resistor 110 and the resistor 112. The ground present on the line BB (FIG. 2) is transmitted via the connected BBA or BBB lines (FIG. 3) of both access circuits and the cathodes of the respective four layer diodes 134 and 136 are at approximately ground potential. The shaped ground pulse applied via input lead ST-4 and the wave shaping circuit to the anodes of the respective four layer diodes fails to fire the four layer diode corresponding to the status indication circuit 50 which was simultaneously sampled, and the access circuits 120 either attempt to complete a connection to another piece of shared equipment to which they provide access or make another attempt to complete a connection via the previously simultaneously seized status indication circuit 50. The likelihood of additional simultaneous attempts by both of the access circuits 120 to complete a connection to the same idle piece of shared equipment is extremely remote.

While the invention has been described with reference to a particular embodiment thereof, it will be apparent to one skilled in the art to which the invention pertains that various modifications in form and detail may be made therein without departing from the spirit and scope of the appended claims.

What is claimed is:

1. In a telephone system, a status indication circuit for indicating the busy-idle condition of shared call processing equipment to an access circuit attempting to complete a connection to the shared equipment, the access circuit having switching means responsive only to a voltage level which is greater than a predetermined voltage level to complete the connection, the status indication circuit comprising:

first circuit means normally presenting a first voltage level to the access circuit when the shared equipment is idle and a second voltage level to the access circuit when the shared equipment is busy, only the first voltage level being greater than the predetermined voltage level, and second circuit means responsive to substantially simultaneous attempts by more than one access circuit to complete connections to the shared equipment to override the first circuit means and to present a third voltage level, which is substantially less than the second voltage level, to the access circuits.

2. A status indication circuit as claimed in claim 1 further comprising:

third circuit means responsive to a completed connection of an access circuit to the shared equipment for maintaining the second voltage level substantially at a second value.

3. A status indication circuit as claimed in claim 2 wherein the third circuit means comprises a breakdown diode connected in parallel with the first circuit means, the first circuit means being connected to a battery which has an output potential which is substantially the first voltage level and being responsive to a completed connection by an access circuit to the shared equipment to reduce the voltage level to at least the second voltage level, the breakdown voltage of the breakdown diode thereby controlling the voltage difference between the first voltage level and the second voltage level.

4. In a telephone system, a status indication circuit for indicating the busy-idle condition of shared call processing equipment to an access circuit attempting to complete a connection to the shared equipment and having switching means responsive to a voltage level which is greater than a predetermined voltage level to complete the connection, the status indication circuit comprising:

first circuit means normally presenting a first voltage level to the access circuit when the shared equipment is idle and a second voltage level to the access circuit when the shared equipment is busy, only the first voltage level being greater than the predetermined voltage level, and second circuit means responsive to a completed connection for controlling the difference between the first voltage level and the second voltage level.

5. A status indication as claimed in claim 4 wherein the second circuit means comprises a breakdown diode connected in parallel with the first circuit means, the first circuit means being connected to a battery which has an output potential which is substantially at the first voltage level and being responsive to a completed connection by an access circuit to the shared equipment to reduce the voltage level to at least the second voltage level, the breakdown vltage of the breakdown diode thereby controlling the voltage difference between the first voltage level and the second voltage level.

6. In a telephone system, a status indication circuit for indicating the busy-idle condition of shared call processing equipment to an access circuit attempting to complete a connection to the shared equipment, the access circuit having switching means responsive only to a voltage level which is greater than a predetermined voltage level to complete a connection to the shared equipment, the status indication circuit comprising:

an input terminal for connection to at least one access circuit;

a switching circuit connected to the input terminal, providing a first output potential at a first voltage level, which is greater than the predetermined voltage level, when fewer than two access circuits are connected to the input terminal;

an output terminal for connection to the switching means in the access circuit;

resistive means connected between the switching circuit and the output terminal, responsive to the connection of an access circuit to the output terminal to produce a voltage drop and thereby to reduce the potential at the output terminal to a second voltage level, which is less than the predetermined voltage, and breakdown means connected in parallel with the resistive means, the breakdown voltage of the breakdown means thereby controlling the voltage difference between the first voltage level and the second voltage level.

7. A status indication circuit as claimed in claim 6 further comprising:

threshold circuit means connected between the input terminal and the switching circuit and being responsive to the connection of more than one access circuit to the input terminal to transmit a switching signal to the switching circuit, the switching circuit being responsive to the switching signal to develop an output potential at a third voltage level which is substantially less than the second voltage level.

8. In a telephone system, the combination of a status indication circuit for indicating the busy-idle condition of shared call processing equipment and of an access circuit for attempting in response to a request-for-service signals, to complete a connection to the shared equipment said combination comprising:

the access circuit including first switching means responsive only to a voltage level which is greater than a predetermined voltage level to complete the connection;

the status indication circuit including first circuit means normally presenting a first voltage level to the access circuit when the shared equipment is idle and a second voltage level to the access circuit when the shared equipment is busy, only the first voltage level being greater than the predetermined voltage level, and second circuit means responsive to a completed connection for controlling the difference between the first voltage level and the second voltage, and the access circuit further including second switching means responsive to the request for service signal for transmitting a signal, which is independent of the first switching means to the status indication circuit as soon as the first switching means initially responds to a first voltage level to complete the connection, the transmitted signal causing the first circuit means to present a second voltage level to the access circuit.

9. The combination as claimed in claim 8 wherein the status indication circuit further comprises:

second circuit means responsive to substantially simultaneous attempts by more than one access circuit to complete a connection to the shared equipment to override the first circuit means and to present a third voltage level, which is less than the second voltage level, to the access circuits.

10. The combination as claimed in claim 8 wherein the access circuit further comprises:

an input terminal for receiving a request-for-service pulse and pulse shaping circuit means connected to the input terminal;

the second switching means comprises first and second four layer diodes having first and second firing voltages, respectively, the magnitude of one of the firing voltages being greater than the magnitude of the other of the firing voltages, and each being arranged to select a different piece of shared equipment, and the pulse shaping circuit being operative to shape a pulse applied to the input terminal into a ramp-shaped wave which is applied to the four layer diodes, the four layer diode having the smaller firing voltage thereby being permitted to fire and to definitively select an idle piece of shared equipment before the other four layer diode fires.

* * * * *